L. E. WEINMANN.
SOFA BED.
APPLICATION FILED APR. 26, 1915.
Reissued Sept. 5, 1916.
14,190.
3 SHEETS—SHEET 1.
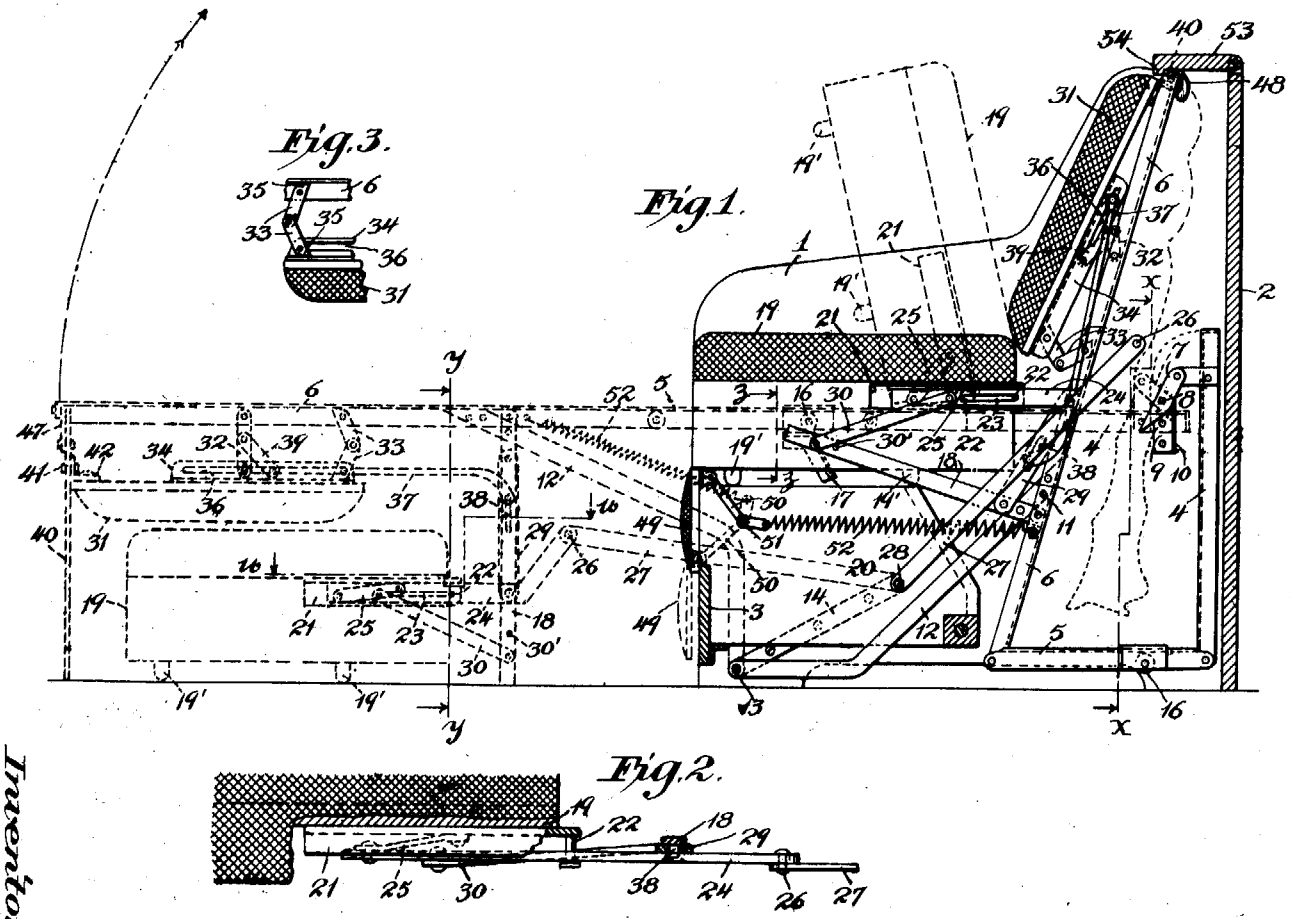
*Inventor:*
Louis E. Weinmann
by Dyenforth, Lee, Chritton & Wiles

L. E. WEINMANN.

SOFA BED.

APPLICATION FILED APR. 26, 1915.

Reissued Sept. 5, 1916.

14,190.

3 SHEETS—SHEET 2.

*Inventor:*

Louis E. Weinmann by Dyer, Foster, Sec. Christton & Wiles

L. E. WEINMANN.

SOFA BED.

APPLICATION FILED APR. 26, 1915.

Reissued Sept. 5, 1916.

14,190.

3 SHEETS—SHEET 3.

Inventor:
Louis E. Weinmann.
by
Dyenforth, Lee, Chritton & Wiles.

UNITED STATES PATENT OFFICE.

LOUIS E. WEINMANN, OF CHICAGO, ILLINOIS, ASSIGNOR TO DAVOPLANE BED COMPANY, OF CHICAGO, ILLINOIS, A CORPORATION OF ILLINOIS.

SOFA-BED.

14,190. Specification of Reissued Letters Patent. Reissued Sept. 5, 1916.

Original No. 1,120,249, dated December 8, 1914, Serial No. 810,374, filed January 5, 1914. Application for reissue filed April 26, 1915. Serial No. 24,099.

*To all whom it may concern:*

Be it known that I, LOUIS E. WEINMANN, a subject of the Emperor of Germany, and a resident of the city of Chicago, county of Cook, and State of Illinois, have invented certain new and useful Improvements in Sofa-Beds, of which the following is a specification.

My invention relates to improvements in sofa beds and has for its object the production of a sofa bed which may be readily and easily converted from a sofa to a bed and vice versa and one which will be durable and economical in construction and efficient in use.

Other objects will appear hereinafter.

The invention consists in the combinations and arrangements of parts hereinafter described and claimed.

Figure 4:
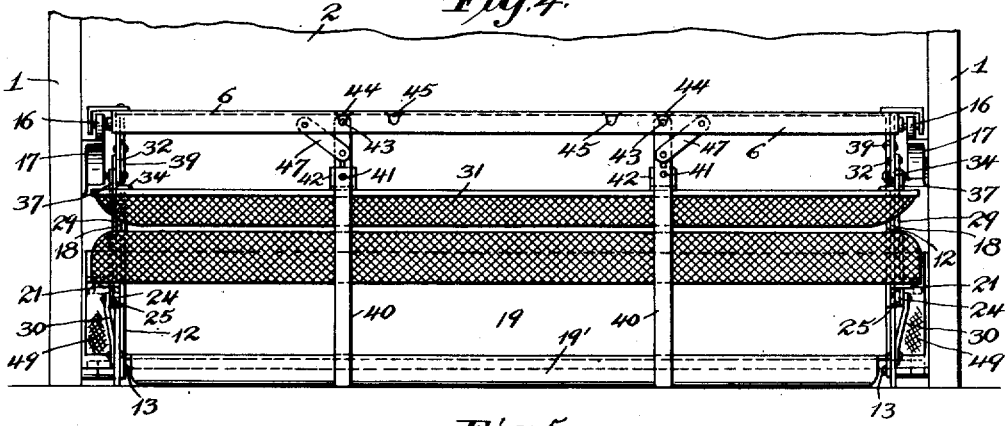
Figure 5:
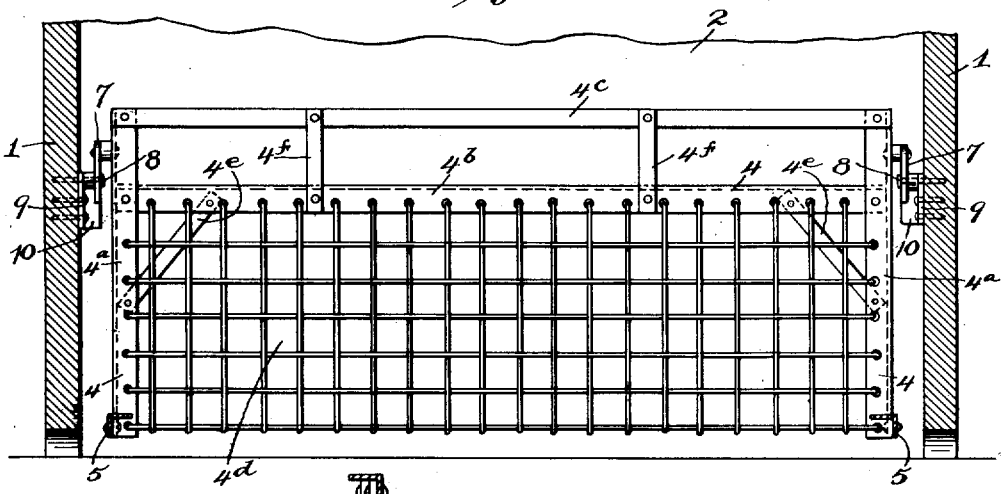
Figure 6:
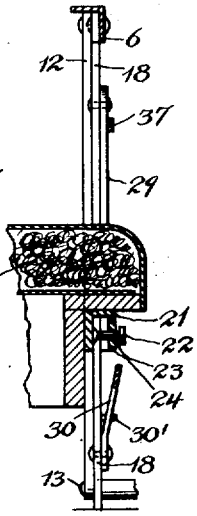
Figure 7:
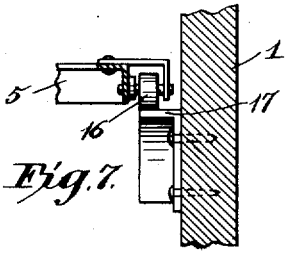
Figure 8:
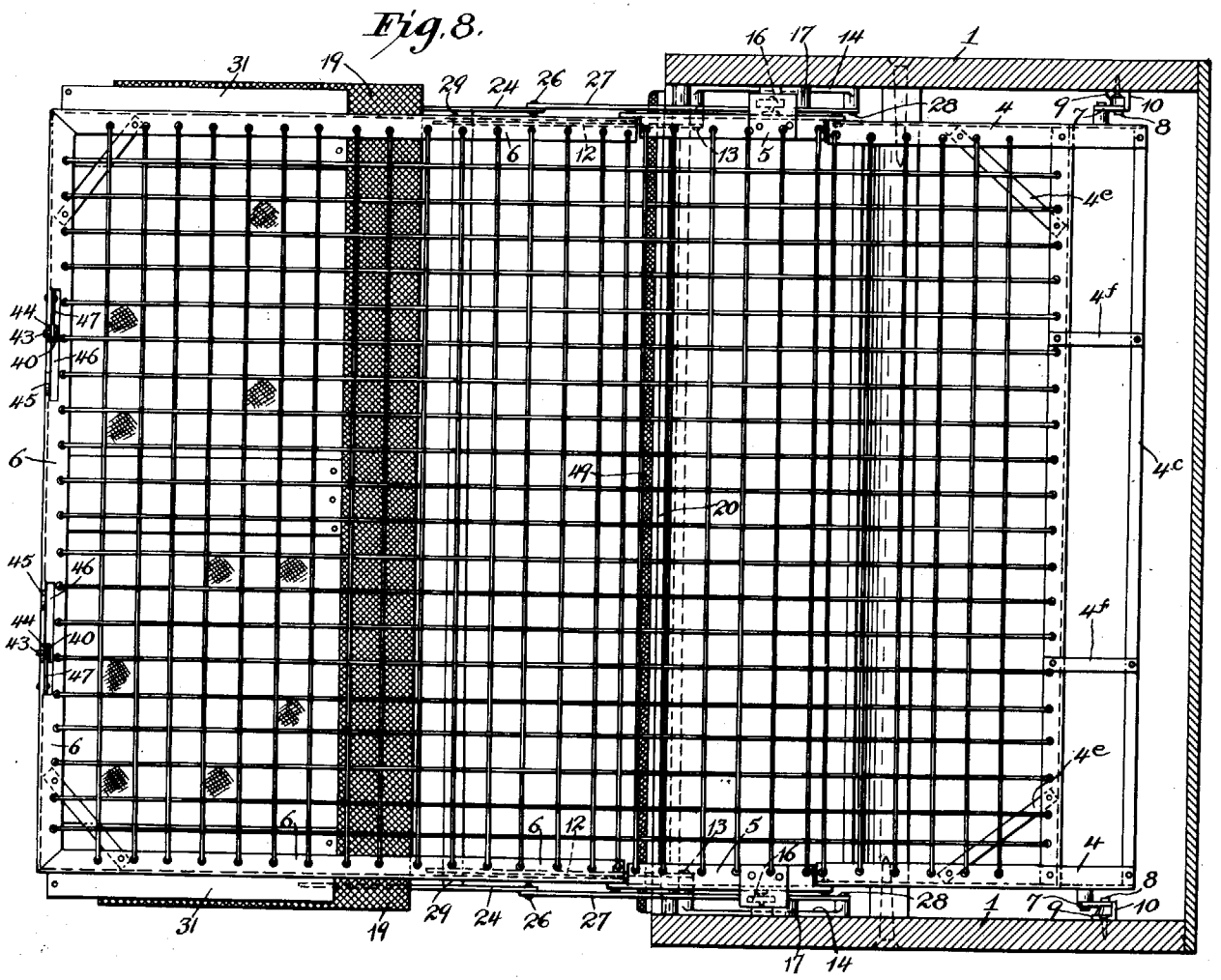

The invention will be best understood by reference to the accompanying drawings forming a part of this specification, and in which, Figure 1 is a vertical section of a sofa bed embodying my invention, the section being taken just inside of one of the end members of the frame of the device, Fig. 2 is an enlarged fragmentary detail section taken on line *w—w* of Fig. 1, Fig. 3 is a fragmentary detail illustrating the connection of one end of the sofa back member with the outer section of the bed bottom, Fig. 4 is a front elevation of the device in unfolded condition, the upper end portion of the frame of the device being broken away, Fig. 5 is a section taken on the line *x—x* of Fig. 1, Figs. 6 and 7 are enlarged fragmentary detail sections taken on lines *y—y* and *z—z* respectively of Fig. 1, and Fig. 8 is a top plan view of the device in unfolded condition, the frame thereof being shown in section.

The preferred form of construction as illustrated in the drawings comprises a frame or body consisting of end members 1 which are spaced apart and rigidly connected by a rear piece 2 and a front bar 3. Arranged in the frame thus formed is the foldable bed bottom consisting of a plurality of pivotally connected sections 4, 5, and 6, the innermost section 4 being pivotally connected at its rearward end with arms 7 which are pivoted at 8 to angle irons 9 rigidly secured to the inner sides of frame members 1. The arrangement is such that, when the bed bottom is in folded condition, as shown in full lines in Fig. 1, the upper ends of the members 7 will rock rearwardly to permit of the bed bottom section 4 assuming a position in close proximity with the frame member 2 so as to permit of a maximum utilization of the space within the frame of the device for storage purposes, as for the mattress or bed clothing arranged upon the bed bottom, as clearly shown in dotted lines in Fig. 1, the upper ends of the members 7, in this position, being limited in their rearward rocking by engagement with the upper ends of inwardly extending flanges 10 of the angle irons 9. In the unfolding of the bed bottom, as will be hereinafter described, to the dotted line position in Fig. 1, the members 7 rock forwardly being limited in their forward movement, by engagement of the lower ends thereof with flanges 10, as will be readily understood.

Rigidly connected at 11 with the outer bed bottom section 6 are the free ends of levers 12, the opposite ends of said levers being fulcrumed at 13 to the frame members 1, straps or cleats 14 being provided at the inner sides of the frame members 1 to reinforce the same at the points of connection therewith of said levers. With this arrangement in the unfolding of the bed bottom, the upper end of the section 6 is engaged and rocked forwardly, the forward rocking being, of course, about the fulcrums 13 of levers 12. In this forward rocking of the section 6, the sections 4 and 5 will be moved therewith and, when the section 6 reaches a horizontal position, said sections 4 and 5 will be in a corresponding coplanar position. The section 5 is provided with rollers 16 adapted, when the bed bottom is unfolded, to rest upon angle irons 17 provided upon the inner sides of the frame members 1 in order to support said bed bottom section in operative position. Said supporting members 17 are comparatively short so that in the rearward or folding movement of the bed bottom, the rollers 16 will move rearwardly and downwardly out of engagement therewith in order to permit of the collapsing or folding of the bed bottom to the condition shown in full lines in Fig. 1.

The rearward end portion of the section 6 of the bed bottom is supported in operative position, when the bed bottom is unfolded, by means of legs 18 which are rigidly secured at their upper ends to the sides of said section, the legs 18 and levers 12 being rigidly connected at their points of intersection in order to produce a rigid construction.

Loosely mounted between the frame members 1 is the sofa seat member 19, substantially rectangular in form and suitably upholstered. Said seat member is provided at its under side with cleats 19[1] adapted, when the former is in operative position, to rest upon the upper edges of a storage receptacle or compartment 20 rigidly secured in position in the lower portion of the frame of the device at the front end thereof. The receptacle 20 is provided for the storage of bed clothing or other articles desired, and the ends thereof are spaced slightly from the corresponding sides of the frame members 1 in order to permit of clearance for the various levers employed in the construction.

The seat member 19 is provided at its respective ends adjacent the rearward end of said member with angle irons 21 rigidly secured thereto. The rearward ends of angle irons 21 are provided with laterally projecting pins 22 which engage elongated slots 23 provided in levers 24, the front ends of said levers being connected by means of links 25 with the angle irons 21, as clearly shown in Fig. 1. This arrangement permits of upward rocking of the seat member in order to permit of access being gained to the storage receptacle 20, it being clear that with the construction set forth, upon upward pressure upon the forward end of the seat member, the pins 22 will slide forwardly in slots 23 of members 24 and the seat member will turn about the points of pivotal connection thereof with the links 25, the rearward ends of the links 25 rocking upwardly in this operation and serving to hold said seat member in elevated position, as shown in dotted lines in Fig. 1.

The rearward ends of the levers 24 are angular in form and pivotally connected at 26 with levers 27 which are fulcrumed at 28 to the inner sides of frame members 1. The forward ends of levers 24 are pivotally connected by means of links 29 and the rear ends of levers 24 by means of links 30 with the legs 18 carried by the bed bottom section 6. Provided upon the legs 18 are laterally projecting stop pins 30[1] which limit rearward rocking of the links 30. The arrangement is such that the seat member will be supported by the levers 24 and in the unfolding movement of the bed bottom, said seat member will be carried forwardly in a substantially horizontal position, and automatically transferred from operative position, as shown in full lines in Fig. 1, to a position resting upon the floor at the under side of the bed bottom, as shown in dotted lines in said figure. Conversely, when the bed bottom is folded, said seat member will be carried upwardly and transferred from its dotted line position in Fig. 1 to its full line or operative position. The links 29 and 30 coöperate with the lever 24 in this operation to constantly maintain the same in a substantially horizontal position and hence to maintain the seat member 19 in a corresponding position, as above set forth. Also arranged between the frame members 1 is the sofa back member 31 which is carried by the section 6 of the bed bottom. Said back member is movably connected with said bed bottom section through the medium of links 32 and 33, corresponding ends of said links being pivotally connected with angle irons 34 which are arranged upon the rearward side of said back member adjacent the lateral edges thereof. The links 33 are of the split-link type, the outer ends of the pivotally connected sections of each of said links being extended as at 35, in Fig. 3, in order to engage against the adjacent portions of the bed bottom sections 6 and angle irons 34 to serve as stops in order to hold said links against assuming dead center positions and in order to insure the breaking of said links in one direction. The angle irons 34 are provided with elongated slots 36 for engagement by the links 32 in order to permit the sliding of the corresponding ends of said links relative to said angle irons under the influence of rods 37 which are connected at corresponding ends of said links relative to said angle irons under the influence of rods 37 which are connected at corresponding ends with said links 32, the opposite ends of said rods being connected with links 29, as clearly shown in Fig. 1.

Elongated slots 38 are provided at the points of pivotal connection of the rods 37 with the links 29 in order to permit of slight relative movement. The links 32 are connected intermediate their ends with corresponding ends of links 39 which are pivotally connected at their rearward ends with the angle irons 34. The arrangement is such that, in the sliding movement of the lower or rearward ends of links 32 in the slots 36, the forward or upper end of the sofa back will be rocked rearwardly to the position shown in full lines in Fig. 1. With this arrangement then the upper end of the sofa back will normally assume the position shown in full lines in Fig. 1. As the bed bottom is unfolded said back member will be carried thereby to a position at the under side thereof when unfolded. As the bed bottom is unfolded, the rods 37 are moved rearwardly, causing the upper or forward end of the back member to move to the dotted line position shown in Fig. 1. Conversely, as the bed bottom is folded, the rods 37 are moved upwardly causing the lower ends of links 32 to be slid forwardly in slots 36 in order to cause the forward or upper edge of said back member to rock rearwardly.

The foreward end of the bed bottom section 6 when in unfolded position, is supported by legs 40 which are pivoted at 41 to angle irons 42 secured rigidly to the forward or upper edge of back member 31, the supporting of the bed bottom section being effected indirectly through said back member and links which connect the same with said bed bottom section. The upper ends of legs 40 are provided with forwardly projecting pins or lugs 43 which engage notches 44 provided in the front bar of the bed bottom section 6 when said legs are in operative position. Also provided in said bar of section 6 are notches 45, the upper side of said bar being provided with elongated slots 46 which extend between the notches 44 and 45, as clearly shown in Fig. 8. Coöperating with the legs 40 are links 47. The arrangement is such that, when the legs 40 are moved upwardly, the upper ends thereof will project through the slots 46, the pins 43 being thereby disengaged from the notches 44. In this upward movement of said legs, the links 47 will operate to cause the upper ends thereof to be rocked inwardly to engage the pins 43 with the notches 45, the lower ends of the links 47 engaging elongated slots provided in the legs 40 in order to permit of relative movement between said parts such as is required in this operation. Hence, with the construction set forth, folding and unfolding of the legs 40 will be effected by movement of the pivotal points 41 of said legs toward and from the bed bottom section 6. This movement of said pivotal points is secured through the movement of the upper or forward edge of the back member toward and from the bed bottom section 6 in the folding and unfolding of the bed bottom, as above described. This movement of the back member being effected automatically with the folding and unfolding operation of the bed bottom, the folding and unfolding of the supporting legs 40 will also be automatically effected, the arrangement being such that, when the bed bottom is unfolded, said legs will be rocked to operative position, and when the bed bottom is folded, said legs will be rocked upwardly into close engagement and parallel with the front bar of the section 6 of the bed bottom.

Provided at the upper end of the bed bottom section 6 is a handle 48 provided to facilitate the unfolding and folding operation of the device.

Provided at the front side of the frame of the device immediately below the seat member 19 is a cross piece 49 which serves normally to close or traverse the gap which otherwise is left between the frame member 3 and the seat member. This member 49 is supported by bell crank levers 50 which are fulcrumed at 51 to the inner sides of frame members 1. The rearward ends of said bell crank levers are connected by means of helical tension springs 52 with the bed bottom section 6, the arrangement being such that, when said bed bottom is in folded condition, said springs will hold the bell crank levers 50 in such a position as to adapt the same to support the member 49 in operative or traversing position. As the bed bottom is unfolded, said springs will cause the forward ends of said bell crank levers to rock downwardly in order to drop the member 49 to non-traversing position and thereby provide clearance for the levers 12 and 27. The movement of the member 49 is thus controlled automatically by the movement of the bed bottom. The springs 52 in addition to serving as means of operation of levers 50, serve also to facilitate the folding and unfolding operation of the bed bottom, the tension of said springs, when the bed bottom is in folded condition, being such as to tend to unfold the bed bottom, and when the bed bottom is in unfolded condition, the tension of said springs is such as to tend to fold the same.

Provided at the upper edge of the frame member 2 is a pivoted leaf 53 adapted normally to close the opening or space between said edge of said member 2 and the upper edge of the bed bottom section 6 when the bed bottom is in folded condition. Said leaf 53 is provided at its forward edge with a depending lip or flange 54 adapted for engagement with the upper edge of bed bottom section 6 in order to releasably lock the same against unfolding movement, it being required, in the unfolding of the bed bottom to first swing the member 53 upwardly in order to release the section 6.

Referring to Figs. 5 and 8 of the drawings, it will be seen that the rear bed section 4 is formed of longitudinal members $4^a$ which are joined intermediate their lengths by a transverse compression member $4^b$ and at their rear ends by a tension member $4^c$. This construction is adopted in order to meet the peculiar conditions which obtain in sofa bed construction. Thus it is difficult to properly brace the individual bed sections against the pull of the bed bottom fabric, designated $4^d$ on the drawing. The truss construction of the rear end of the bed section 4 aids materially in bracing the longitudinal members $4^a$ of the frame and by providing braces $4^e$ extending diagonally across the corners the longitudinal members are further strengthened and stiffened and it becomes unnecessary to make use of the customary transverse brace. The pull of the longitudinal wires of the fabric $4^d$ which tends to distort the compression member $4^b$ may be resisted by tie-members $4^t$ which join the compression member to the tension member. This form of trussed end section is simple and light in construction and is peculiarly advantageous in my sofa bed in that the forward ends of the longitudinal members $4^a$ are stiffened so that they may rigidly support the intermediate bed section 5 and hold the latter against the pull of the bed fabric.

A sofa bed of the construction set forth may be readily and easily manipulated and will be found highly efficient in use.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A sofa bed comprising a frame embodying rigidly connected end members; a bed bottom comprising a plurality of pivotally connected sections, one end of said bed bottom being pivotally secured to said frame between said end members, said bed bottom being adapted, when not in use, to be folded to position between said end members; and a sofa back member and a sofa seat member connected with the outer section of said bed bottom and supported in operative positions by said bed bottom when in folded condition, and adapted, when said bed bottom is extended, to be carried thereby to positions at the under side thereof, substantially as described.

2. A sofa bed comprising a frame embodying rigidly connected end members; a bed bottom comprising a plurality of pivotally connected sections, one end of said bed bottom being pivotally secured to said frame between said end members, said bed bottom being adapted, when not in use, to be folded to position between said members; a sofa back member; a sofa seat member; and a link connection between said back and seat members and said bed bottom whereby said members will be supported in operative positions when said bed bottom is in folded condition and whereby, when said bed bottom is extended, said members will be carried thereby to positions at the under sides thereof, substantially as described.

3. A sofa bed comprising a frame embodying rigidly connected end members; a bed bottom comprising a plurality of pivotally connected sections, one end of said bed bottom being pivotally secured to said frame between said end members, said bed bottom being adapted, when not in use, to be folded to position between said end members; a sofa back member supported in operative position by said bed bottom when in folded condition and adapted to be carried to a position at the under side thereof, when said bed bottom is extended; a sofa seat member; a pair of levers fulcrumed to said frame with the free ends of which said seat member is pivotally connected; and an operative connection between said seat member and said bed bottom whereby said seat member will be supported in operative position, when said bed bottom is in folded condition and whereby, when said bed bottom is extended, said seat member will be rocked to position at the under side thereof, substantially as described.

4. A sofa bed comprising a frame embodying rigidly connected end members; a foldable sectional bed bottom; a pivotal connection between the inner end of said bed bottom and said end members permitting of said bed bottom to be extended into horizontal position for use and, when not in use, to be folded to position between said end members; a sofa back member supported in operative position by the outermost of the sections of said bed bottom, when the latter is in folded condition and adapted to be carried to a position at the under side of said bed bottom, when the latter is extended; a sofa seat member; and an operative connection between said seat member and said outermost section of said bed bottom whereby said seat member will be supported in operative position, when said bed bottom is in folded condition and whereby, when said bed bottom is extended, said seat member will be rocked to position at the under side thereof, substantially as described.

5. A sofa bed comprising a frame embodying rigidly connected end members; a bed bottom comprising a plurality of pivotally connected sections; a pivotal connection between the innermost of said sections and said end members; a pair of levers pivotally connected at corresponding ends with said end members and having their opposite ends rigidly connected with the outermost section of said bed bottom, whereby said bed bottom may be folded to position between said end members and unfolded into horizontal position extending therefrom; and sofa back and sofa seat members operatively connected with said bed bottom whereby the same will be supported in operative position, when said bed bottom is in folded condition, and whereby, when said bed bottom is extended, said sofa back and seat members will be moved to positions at the under side thereof, substantially as described.

6. A sofa bed comprising a frame; a sectional foldable bottom pivotally connected with said frame so as to permit of folding of said bed bottom to extend horizontally from said frame; a pair of levers pivotally connected at corresponding ends with said frame and having their opposite ends rigidly connected with the outermost section of said bed bottom, whereby, upon forward rocking of the free ends of said levers, said bed bottom will be unfolded into horizontal position extending from said end members, and, upon rearward rocking of said ends of said levers, said bed bottom will be collapsed and folded to position between said end members; a pair of legs rigidly connected with said outermost bed bottom section for supporting the same in operative position when the latter is extended; a sofa back member carried by said outermost section of said bed bottom and supported thereby in operative position when said bed bottom is in folded condition, and carried to a position below said bed bottom section, when said bed bottom is unfolded; a sofa seat member; a second pair of levers or arms swingingly connected with said supporting legs for moving said seat member to operative position when said bed bottom is folded and for carrying said member to position below said bed bottom when the latter is unfolded; and a third pair of levers pivotally secured in said frame and having their free ends connected with said arms for coöperation therewith in moving said seat member, substantially as described.

7. A sofa bed comprising a frame; a sectional foldable bottom pivotally connected with said frame so as to permit of folding of said bed bottom to extend horizontally from said frame; a pair of levers pivotally connected at corresponding ends with said frame and having their opposite ends rigidly connected with the outermost section of said bed bottom, whereby, upon forward rocking of the free ends of said levers, said bed bottom will be unfolded into horizontal position extending from said end members, and, upon rearward rocking of said ends of said levers, said bed bottom will be collapsed and carried to position between said end members; a pair of legs rigidly connected with said outermost bed bottom section for supporting the same in operative position when the latter is extended; a sofa back member carried by said outermost section of said bed bottom and supported thereby in operative position when said bed bottom is in folded condition, and carried to a position below said bed bottom section, when said bed bottom is unfolded; a sofa seat member; a second pair of levers or arms; a pair of links swingingly connecting each of said arms with said supporting legs for moving said seat member to operative position when said bed bottom is folded and for carrying said seat member to position below said bed bottom when the latter is unfolded; and a third pair of levers pivotally secured in said frame and having their free ends connected with said arms for coöperation therewith in moving said seat member, substantially as described.

8. A sofa bed comprising a frame embodying rigidly connected end members; a bed bottom comprising a plurality of pivotally connected sections, the inner end of said bed bottom being pivotally secured to said frame between said end members, said bed bottom being adapted, when not in use, to be folded to position between said end members, a sofa back member supported in operative position by said bed bottom, when in folded condition, and adapted, when said bed bottom is extended, to be carried thereby to position at the under side thereof; foldable legs for supporting the outer end of said bed bottom when the latter is extended; and an operative connection between said back member and said legs whereby said legs will be automatically unfolded, when said back member is carried by said bed bottom to position at the under side thereof, and whereby said legs will be automatically folded, when said back member is carried by said bed bottom to operative position, substantially as described.

9. A sofa bed comprising a frame; a foldable sectional bed bottom having its inner end pivotally connected with said frame; a sofa back member movably supported in operative position by said bed bottom when in folded condition, and adapted, when said bed bottom is extended, to be carried thereby to position at the under side thereof; means for moving said back member relative to said bed bottom in the folding and unfolding operation of the latter; foldable legs for supporting the outer end of said bed bottom when the latter is extended; and means for automatically unfolding said legs when said bed bottom is unfolded, and folding said legs when said bed bottom is folded, substantially as described.

10. A sofa bed comprising a frame having an opening at its front side; a foldable sectional bed bottom having one end pivotally connected with said frame so as to permit of folding of said bed bottom to position in said frame or unfolding of said bed bottom to extend horizontally from said frame; a translatably movable transversely extending piece adapted to normally close the opening at the front side of said frame; and an operative connection between said piece and said bed bottom whereby, when said bed bottom is in folded condition, said piece will be supported in operative position to traverse said opening and, when said bed bottom is unfolded, said piece will be moved to non-traversing position, substantially as described.

11. A sofa bed comprising a frame; a foldable sectional bed bottom having one end pivotally connected with said frame so as to permit of folding of said bed bottom to position in said frame or unfolding of said bed bottom to extend horizontally from said frame; a movable transversely extending piece adapted to normally close an opening at the front side of said frame; a bell crank lever supporting said piece; and an operative connection between said bell crank lever and said bed bottom, whereby, when said bed bottom is in folded condition said piece will be supported in operative position to traverse said opening, and when said bed bottom is unfolded, said bell crank lever will be rocked to carry said piece to non-traversing position, substantially as described.

12. A sofa bed comprising a frame; a foldable sectional bed bottom having one end pivotally connected with said frame so as to permit of folding of said bed bottom to position in said frame or unfolding of said bed bottom to extend horizontally from said frame; a movable transversely extending piece adapted to normally close an opening at the front side of said frame; a bell crank lever supporting said piece; and helical tension springs operatively connecting said bell crank lever with said bed bottom whereby, when said bed bottom is in folded condition, said piece will be supported in operative position to traverse said opening and, when said bed bottom is unfolded, said bell crank lever will be rocked to carry said piece to non-traversing position, substantially as described.

13. A sofa bed comprising a frame embodying rigidly connected end members; a bed bottom comprising a plurality of pivotally connected sections, one end of said bed bottom being pivotally secured to said frame between said end members, said bed bottom being adapted, when not in use, to be folded to position between said end members; a sofa back member and a sofa seat member supported in operative positions by said bed bottom when in folded condition and adapted, when said bed bottom is extended to be carried thereby to positions at the under sides thereof; and means at the upper end of said frame for releasably locking said bed bottom in folded condition, substantially as described.

14. A sofa bed comprising a frame embodying rigidly connected end members; a bed bottom comprising a plurality of pivotally connected sections, one end of said bed bottom being pivotally secured to said frame between said end members, said bed bottom being adapted, when not in use, to be folded to position between said end members; a sofa back member and a sofa seat member supported in operative positions by said bed bottom when in folded condition and adapted, when said bed bottom is extended to be carried thereby to positions at the under sides thereof; and a pivoted leaf at the upper end of said frame adapted for releasable engagement with the outer end of said bed bottom, when the latter is in folded condition, to releasably lock the latter against unfolding movement, substantially as described.

15. A sofa bed comprising a frame embodying rigidly connected end members; a storage receptacle rigidly supported in the lower end of said frame between said end members; a foldable sectional bed bottom arranged between said end members and having its inner end pivotally connected with said frame, permitting of said bed bottom being folded to position in said frame or unfolded to extend horizontally therefrom; a sofa seat member adapted, when in operative position, to rest upon said storage receptacle; and an operative connection between said bed bottom and said seat member permitting of upward rocking of the forward end of said seat member to permit of access being gained to said receptacle, and whereby said seat member will be held in operative position upon said receptacle when said bed bottom is in folded condition and carried from its position upon said receptacle to position below said bed bottom resting upon the floor, when said bed bottom is unfolded, substantially as described.

16. A sofa bed comprising a frame, a sofa seat member, a sofa back member, front and rear bed bottom sections in planes opposite one another and behind the said sofa back member when in folded condition, connecting means joining the said sections at their lower ends, connections between the frame and the said sections which permit the latter to be separated at their upper ends, and extended into a single horizontal plane to constitute a bed bottom, and connections between the said sofa seat member and the said bed sections whereby the former is moved to a position beneath the latter by the extending motion thereof.

17. A sofa bed comprising a frame, a sofa seat member, a sofa back member, front and rear bed bottom sections lying in planes opposite one another and behind the said sofa back member when in folded condition, connecting means joining the said sections at their lower ends, connections between the frame and the said sections whereby the latter may be separated at their upper ends and extended into a single plane to constitute a bed bottom, and means operable by the extending movement of the said sections to shift the said sofa seat and back members to positions beneath the plane of the bed bottom.

18. A sofa bed comprising a frame, a sofa seat member, a sofa back member, a front bed bottom section lying in a plane opposite and behind the rear face of the said seat member, a rear bed section lying in a plane opposite and behind the said first-named bed section, an intermediate bed section connecting the said first-named sections at their lower ends, and connections between the frame and the said sections whereby the latter may be separated at their upper ends and extended into a single plane to constitute a bed bottom.

19. A sofa bed comprising a frame, a sofa seat member, a sofa back member, bed bottom sections lying behind the said sofa back member when in folded condition, connections between the frame and the said sections whereby the latter may be extended into a single plane to constitute a bed bottom, and means operable by the extending motion of the said sections to shift the said sofa seat member forwardly and downwardly to a position beneath the plane of the said bed bottom.

20. In a sofa bed, a bed section comprising spaced parallel frame members, a compression member joining the said frame members intermediate their lengths, a bed bottom fabric stretched between the said frame members on one side of the said compression member, and a tension member joining said frame members on the other side of the said compression member.

21. In a sofa bed, a bed section comprising spaced parallel frame members, a compression member joining the said frame members intermediate their lengths, a bed bottom fabric stretched between the said frame members at one side of the said compression member, a tension member connecting the said frame members at the other side of the said compression member, braces connected to the said frame members and the said compression member opposite the angles between the said members on the bed fabric end of the said frame members, and ties joining the said compression and tension members intermediate their length.

22. A sofa bed comprising a frame embodying rigidly connected end members, a bed bottom comprising a plurality of pivotally connected sections, one end of said bed bottom being pivotally connected to said frame between said end members, said bed bottom being adapted, when not in use, to be folded to a position between said end members, and a sofa back member and a sofa seat member each mounted turnably on the outer section of said bed bottom and supported in operative positions, and adapted, when said bed bottom is extended, to be carried thereby to positions at the underside thereof, substantially as described.

23. A device of the class described, comprising a sofa frame, in combination with a three-section foldable bed bottom, the outer sections being movable to upright positions in the back part of said frame in spaced relation to each other with the medial section disposed between their lower ends, one of said outer sections having an arm whereon it may be swung, said arm being mounted turnably on the lower forward part of said frame.

24. A device of the class described, comprising a sofa frame, in combination with a three-section foldable bed bottom, the outer sections being movable to upright positions in the back part of said frame in spaced relation to each other with the medial section disposed between their lower ends, one of said outer sections having an arm whereon it may be swung, said arm being mounted turnably on the lower forward part of said frame, and the other of said outer sections being supported turnably by the rearward part of said frame.

25. A device of the class described, comprising a sofa frame, a movable back, and a movable seat, in combination with a foldable bed bottom including a foot section, a head section, and a connecting section, a supporting arm attached to said foot section and having turning relation with and supported by the lower forward part of said frame, and said head section being supported turnably adjacent to its rear edge on said frame, said back and seat being swung from and restored to their normal positions by the operation of the bed bottom.

26. A sofa frame, in combination with a transversely extensible three-section bed bottom, the foremost of the bed sections having a rigid supporting arm fixed thereto, adjacent to or near its rear edge, said arm being turnably mounted on the lower forward part of said frame for swinging upwardly and forwardly, and reversely, in unfolding and folding said bed bottom respectively, the rearward section being mounted turnably on said frame for downward swinging of its forward edge in folding, and the medial section being secured pivotally at its front and rear edges to said foremost and rearward sections respectively, said sections having an aggregate length equal substantially to the length of a normal full-sized bed.

LOUIS E. WEINMANN.

In presence of—
N. B. Dearborn,
D. C. Thorsen.